United States Patent
Eble (10) Patent No.: US 11,216,920 B2
(45) Date of Patent: Jan. 4, 2022

(54) ENHANCED LOCAL CONTRAST

(71) Applicant: Apple Inc., Cupertino, CA (US)

(72) Inventor: Tobias Eble, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/860,212

(22) Filed: Apr. 28, 2020

(65) Prior Publication Data

US 2020/0380647 A1  Dec. 3, 2020

Related U.S. Application Data

(60) Provisional application No. 62/855,124, filed on May 31, 2019.

(51) Int. Cl.
| | |
|---|---|
| G06T 5/00 | (2006.01) |
| G06T 15/50 | (2011.01) |
| G06T 15/60 | (2006.01) |

(52) U.S. Cl.
CPC ............ *G06T 5/008* (2013.01); *G06T 15/503* (2013.01); *G06T 15/60* (2013.01); *G06T 2215/12* (2013.01)

(58) Field of Classification Search
CPC ................................ G06T 15/60; G06T 5/008
See application file for complete search history.

(56) References Cited

U.S. PATENT DOCUMENTS

| | | | | |
|---|---|---|---|---|
| 8,300,890 | B1 * | 10/2012 | Gaikwad ............ | G06K 9/00771 382/103 |
| 8,670,000 | B2 | 3/2014 | Braun et al. | |
| 9,147,111 | B2 | 9/2015 | Fleck et al. | |
| 10,209,520 | B2 | 2/2019 | Bell | |
| 10,281,987 | B1 * | 5/2019 | Yang .................... | G06F 3/04847 |
| 2012/0098945 | A1 * | 4/2012 | McKiel, Jr. .......... | H04N 13/341 348/58 |
| 2013/0194259 | A1 * | 8/2013 | Bennett ................. | G06T 19/006 345/420 |
| 2014/0125668 | A1 * | 5/2014 | Steed ...................... | G06T 15/50 345/426 |
| 2016/0093034 | A1 * | 3/2016 | Beck ..................... | G06T 3/4061 345/617 |
| 2016/0116979 | A1 * | 4/2016 | Border ................... | G06K 9/222 345/156 |
| 2016/0125656 | A1 * | 5/2016 | James ................ | G02B 27/0101 345/633 |
| 2017/0006234 | A1 * | 1/2017 | Higuchi ................ | G06T 3/4038 |
| 2017/0038593 | A1 | 2/2017 | Travers | |
| 2017/0090194 | A1 * | 3/2017 | Hayes ................... | G06T 19/006 |
| 2017/0270707 | A1 | 9/2017 | Kass | |
| 2018/0365861 | A1 * | 12/2018 | Reynolds .................. | G06T 7/90 |
| 2019/0317600 | A1 * | 10/2019 | White .................. | G01C 21/365 |
| 2020/0225737 | A1 * | 7/2020 | Limor ..................... | G06F 3/011 |

* cited by examiner

*Primary Examiner* — Phi Hoang
(74) *Attorney, Agent, or Firm* — Thompson Hine LLP (57) ABSTRACT

Various implementations provided herein provide content on an optical see-through display using enhanced local contrast. In some implementations, the enhanced local contrast may be used to provide an apparent reduction in brightness (e.g., a shadow) or other visual effect. For example, the appearance of a virtual shadow of a virtual cup on a real table of a physical environment can be provided even though the brightness of the table cannot be reduced. The appearance of the shadow may be provided by selectively enhancing contrast that the user cognitively interprets to see a relatively "darker" area where the shadow should be (e.g., via an optical illusion/effect).

21 Claims, 6 Drawing Sheets

ENHANCED LOCAL CONTRAST

CROSS-REFERENCE TO RELATED APPLICATIONS

This Application claims the benefit of U.S. Provisional Application Ser. No. 62/855,124 filed May 31, 2019, which is incorporated herein in its entirety.

TECHNICAL FIELD

The present disclosure generally relates to providing content on electronic devices, and in particular, to systems, methods, and devices for providing content on optical see-through devices.

BACKGROUND

Virtual content may be included as part of content provided on optical see-through devices. For example, a user may see a real table of his or her physical environment through a see-through portion of a display and also see a virtual cup displayed on or reflected from that same see-through portion of the display. The virtual cup may be positioned and configured such that it appears to the user to be resting on top of a surface of the real table. The appearance of such virtual objects could be more realistic through the use of virtual shadows and other added realistic features. However, displaying such features is often not possible given the additive light characteristic of many see-through devices. For many such devices, virtual content is displayed on or reflected from a see-through display. The virtual content may be in front of real content and the light from the virtual content may add to the light reflected from the real content that is seen through the device. In such systems it is possible to make a virtual cup visible because displaying the virtual cup involves adding brightness to the underlying light of the table. In contrast, it is not possible to display negative light, for example, to display virtual content that makes a portion of the table appear darker to provide a virtual shadow of the virtual cup.

SUMMARY

Some implementations provided herein provide content on an optical see-through device using enhanced local contrast. In some implementations, the enhanced local contrast may be used to provide an apparent reduction in brightness (e.g., a shadow) or other visual effect. For example, the appearance of a virtual shadow of a virtual cup on a real table of a physical environment can be provided even though the brightness of the table cannot be reduced. The appearance of the shadow may be provided by selectively enhancing contrast that the user cognitively interprets to see a relatively "darker" area where the shadow should be (e.g., via an optical illusion/effect).

In some implementations, an electronic device uses a processor to perform a method. The method generates virtual content. For example, this may involve generating virtual content that includes both a virtual cup and a virtual shadow for the cup. In some implementations, a target appearance of virtual content is determined that accounts for the physical environment, e.g., a virtual cup on a real table with virtual shadows on the table based on a real light source of the physical environment. The target appearance may be determined via an image or model of the physical environment and a photo-realistic 3D rendering technique. Generating the virtual content may involve determining an image of all of the virtual content (e.g., the virtual object plus the virtual shadow without the real table), for example, by subtracting an image of the physical environment from the target appearance.

The method also determines an image of a displayable portion of the virtual content. The displayable portion of the virtual content is the portion of it that is capable of being displayed on a see-through device. For example, determining the displayable portion may involve determining a portion of an image of all of the virtual content that satisfies certain display criteria, e.g., pixels having brightness values greater than zero or some other threshold value. The image of the displayable portion of the virtual content may thus include only virtual content that has positive or actual brightness and thus be capable of being displayed on the optical see-through display.

The method generates enhanced virtual content by enhancing local contrast of the image of the displayable portion of the virtual content. In some implementations, the enhanced virtual content is produced by blending the image of the displayable portion with an image of all of the virtual content. Since the image of all of the virtual content will generally have more contrast, the blending may have the effect of adding contrast to the image of the displayable portion. This added contrast can be used to achieve visual effects that mimic shadows and other natural visual characteristics. The blending may selectively use relatively more of certain contrast levels than other contrast levels of each image to selectively increase contrast with limited addition to overall brightness.

The method displays the enhanced virtual content on the see-through device. In some implementations, the virtual content that is displayed includes a virtual object and virtual content that provides enhanced contrast over real content. The virtual content over the real content may provide a visual effect that mimics darkening of a portion of the real object or otherwise changing the appearance of the real object. For example, adding contrast over the real table may cause the user to perceive a relatively lighter portion of the table and a relatively darker portion of the table, e.g., a shadow, even though that portion of the table is not actually darker than the real table. In other implementations, the enhanced contrast is used to improve the appearance of a virtual object itself or to improve the appearance of an intersection, contact, or boundary between a virtual object and real content.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 1:
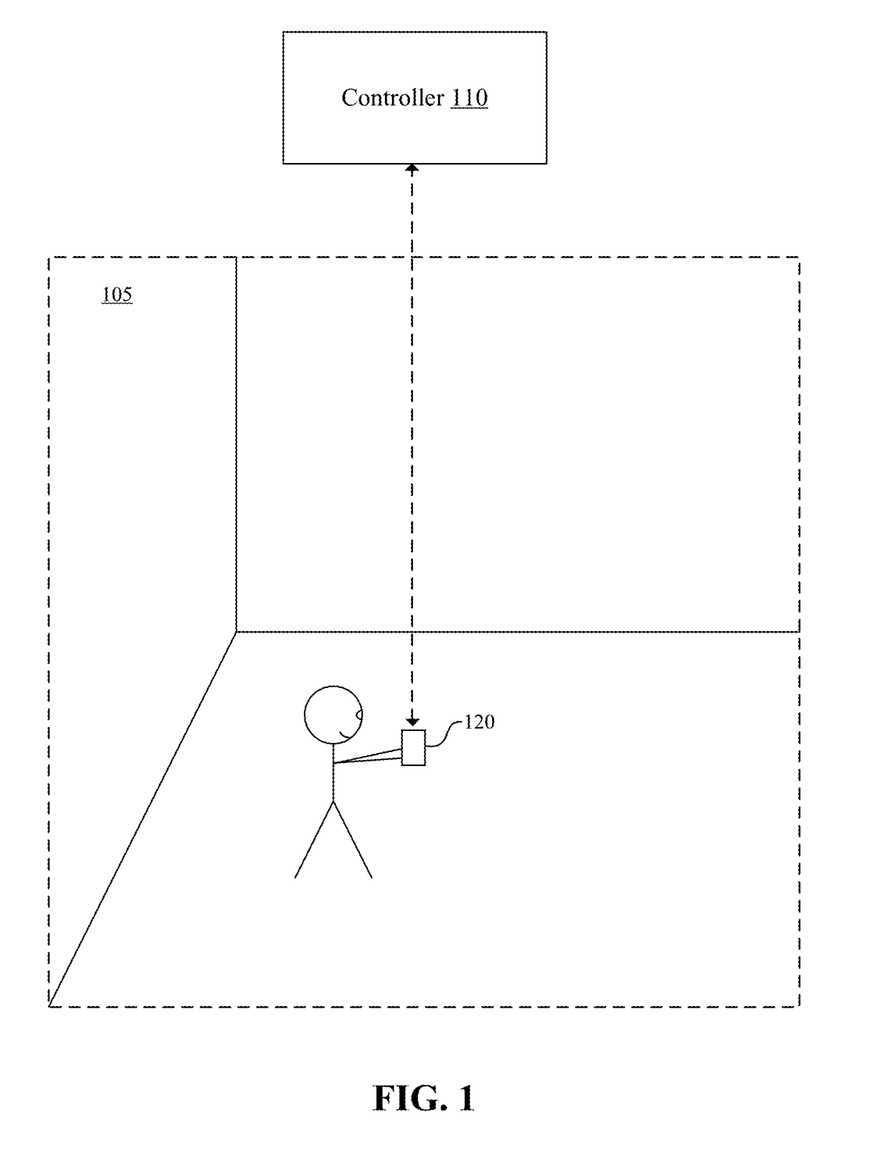
FIG. 1 illustrates an example operating environment in accordance with some implementations.
Figure 2:
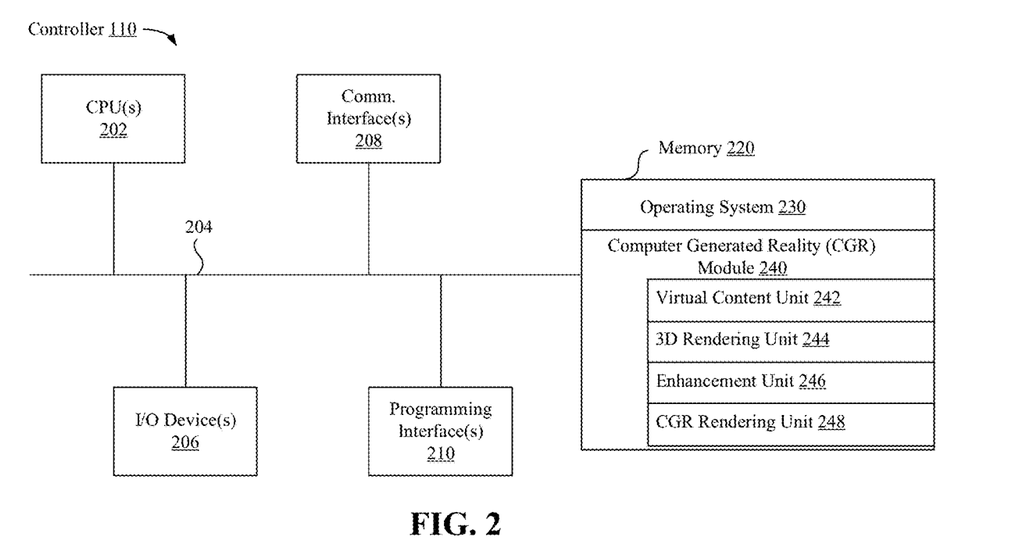
FIG. 2 illustrates an example controller in accordance with some implementations.
Figure 3:
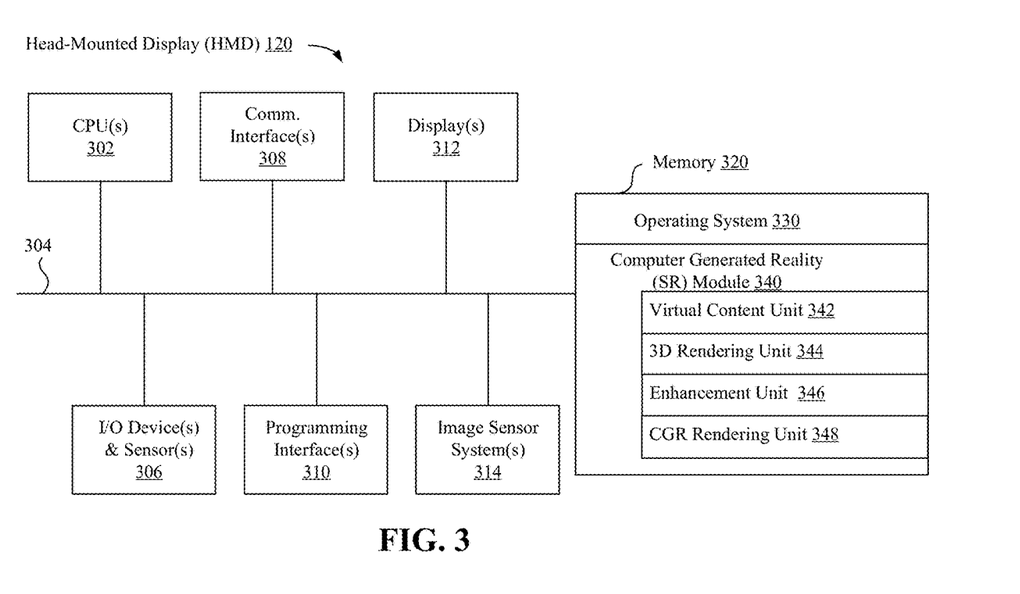
FIG. 3 illustrates an example see through device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. FIGS. 1-3 depict exemplary implementations involving an optical see through device such as an additive handheld display or a head mounted device (HMD).

FIG. 1 illustrates an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a content experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present content to the user. In some implementations, the device 120 includes a suitable combination of software, firmware, or hardware. The device 120 is described in greater detail below with respect to FIG. 3. In some implementations, the functionalities of the controller 110 are provided by or combined with the device 120, for example, in the case of an additive handheld device or an HMD that functions as a stand-alone unit.

According to some implementations, the device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, a device in which at least some light of the physical environment may pass through a transparent or translucent display is called an "optical see through" device.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a device may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 illustrates an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the computer-generated reality (CGR) module 240 includes a virtual content unit 242, a 3D rendering unit 244, and enhancement unit 246, and a CGR rendering unit 248. The virtual content unit 242 is configured to produce virtual content in 2D or 3D models, images, or other forms. The 3D rendering unit 244 may also be configured to render virtual content. For example, the 3D rendering unit may create or use a 3D model of the physical environment (e.g., table, light source, etc.) with a 3D model of a virtual object (e.g., a virtual cup) included and produce a virtual shadow or other virtual effect. The enhancement unit 246 is configured to produce enhanced virtual content, including virtual content that enhances local contrast in the CGR environment. The CGR rendering unit 248 presents the CGR environment using the enhanced virtual content, for example, by providing the enhanced virtual content for display on or for reflection onto a see-through display of device 120. In some implementations, the CGR rendering unit 248 presents a sequence of frames on a display of the device 120 in which each frame includes enhanced virtual content.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 illustrates an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present content to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the device 120 includes a single display. In another example, the device 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks.

In some implementations, the computer-generated reality (CGR) module 340 includes a virtual content unit 342, a 3D rendering unit 344, and enhancement unit 346, and a CGR rendering unit 348. The virtual content unit 342 is configured to produce virtual content in 2D or 3D models, images, or other forms. The 3D rendering unit 344 is configured to render virtual content. For example, the 3D rendering unit may create or use a 3D model of the physical environment (e.g., table, light source, etc.) with a 3D model of a virtual object (e.g., a virtual cup) included and produce a virtual shadow or other virtual effect. The enhancement unit 346 is configured to produce enhanced virtual content, including virtual content that enhances local contrast in the CGR environment. The CGR rendering unit 348 presents the CGR environment using the enhanced virtual content, for example, by providing the enhanced virtual content for display on or for reflection onto a see-through display of device 120. In some implementations, the CGR rendering unit 348 presents a sequence of frames on a display of the device 120 in which each frame includes enhanced virtual content.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
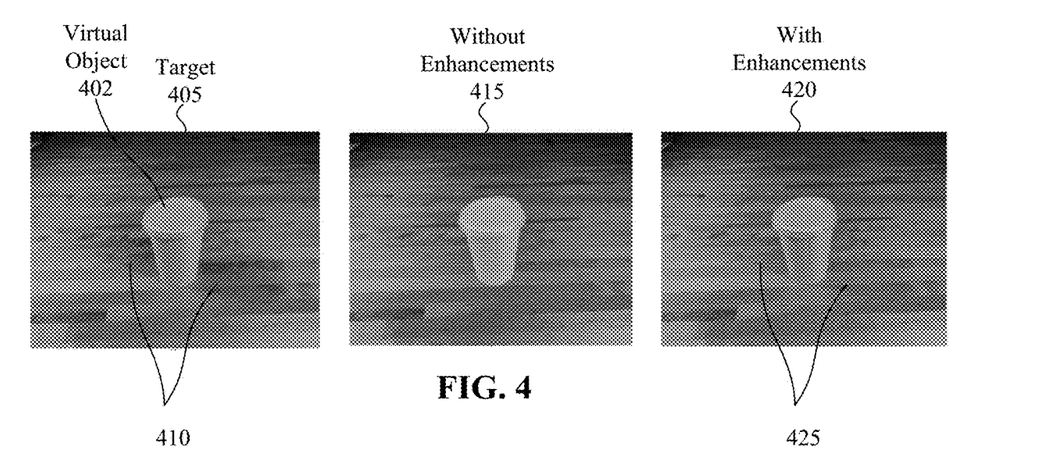
FIG. 4 illustrates a comparison of a target appearance, an environment without enhancements, and an environment with enhancements.

FIG. 4 illustrates a target appearance image 405, an image of an environment without enhancements 415, and an image of the environment with enhancements 420. Specifically, the target appearance image 405 includes a virtual object 402—the virtual coffee cup—along with virtual shadows 410 for the virtual object 402. In this example, the virtual shadows 410 may be produced via a 3D rendering technique that simulates the shadows based on a 3D model of the virtual coffee cup and a real or virtual light source. Since there is no way to directly display the virtual shadows 410 on the intended optical see-through device using prior techniques, the appearance of the environment would not include the shadows and would appear as depicted in the image of the environment without enhancement 415.

In contrast, using one or more of the techniques disclosed herein, an environment with virtual content enhancements may appear as depicted in the image of the environment with virtual content enhancements 420. In this example, virtual content is added in front of areas on either side of the virtual object 402 to enhance local contrast, creating the appearance of shadows at locations 425. In this example, the appearance of shadows at locations 425 is provided without needing to make those areas darker. Instead local contrast around those locations 425 results in an appearance of relative darkness at those locations 425.

Figure 5:
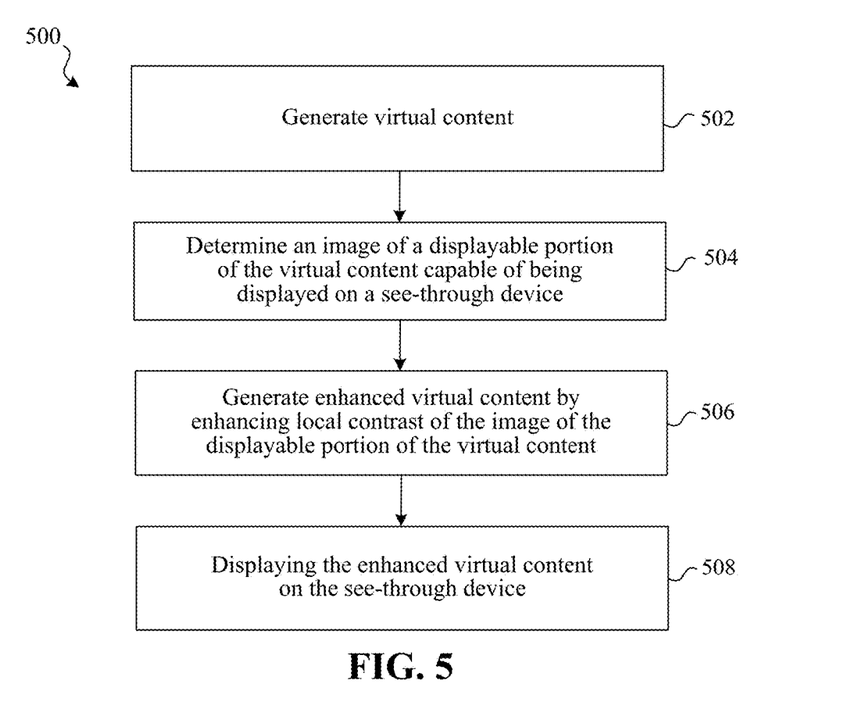
FIG. 5 is a flowchart illustrating an exemplary method for providing content.

FIG. 5 is a flowchart illustrating an exemplary method for providing content such as a CGR environment. In some implementations, the method 500 is performed by a device (e.g., controller 100 or device 120 of FIGS. 1-3). The method 500 can be performed at a mobile device, HMD, desktop, laptop, server device, or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 502, the method 500 generates virtual content. For example, this may involve generating virtual content that includes both a virtual cup and a virtual shadow for the cup. In some implementations, a target appearance of virtual content is determined that accounts for the physical environment, e.g., a virtual cup on a real table with virtual shadows on the table based on a real light source of the physical environment. The target appearance may be determined via an image or model of the physical environment and a photo-realistic 3D rendering technique. Generating the virtual content may involve determining an image of all of the virtual content (e.g., the virtual object plus the virtual shadow without the real table), for example, by subtracting an image of the physical environment from the target appearance.

Figure 6:
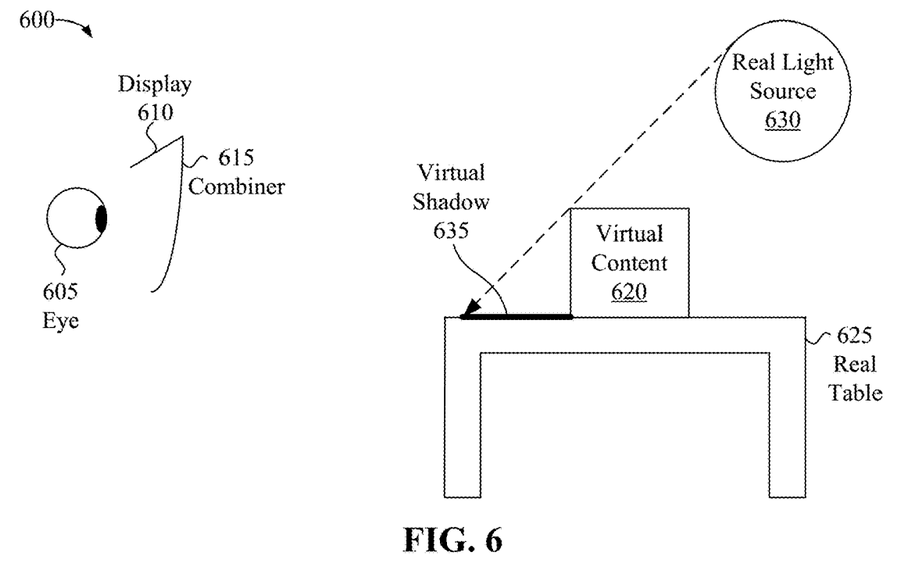
FIG. 6 illustrates virtual content created with reference to a physical environment.

FIG. 6 is a block diagram illustrating virtual content generated based on a real light source of the physical environment. In this example, a user is viewing (e.g., via eye 605) an environment through a combiner 615, e.g., through a see-through display. The combiner 615 may allow the user to see some of the physical environment around the user while also presenting virtual content on display 610 that is reflected on and thus also viewed on the combiner 615. In this example, the physical environment includes a real table 625 and a real light source 630. Creating virtual content can involve determining a 2D or 3D model of such a real environment and determining a relative position of virtual content, e.g., virtual content 620. Creating virtual content can further involve determining a realistic virtual effect, e.g., virtual shadow 635 based on the relative position of the virtual content 620 to the real light source 630 in the model.

Returning to FIG. 5, after generating virtual content, at block 504 the method 500 determines an image of a displayable portion of the virtual content capable of being displayed on a see-through device. For example, determining the displayable portion may involve determining a portion of an image of all of the virtual content that satisfies certain display criteria, e.g., pixels having brightness values greater than zero or some other threshold value. The image of the displayable portion of the virtual content may thus include only virtual content that has positive or actual brightness and thus is capable of being displayed on the optical see-through display. The image of the displayable portion of the virtual content may exclude negative brightness that cannot be displayed on the see-through device.

At block 506, the method 500 generates enhanced virtual content by enhancing local contrast of the image of the displayable portion of the virtual content. In some implementations, the enhanced virtual content is produced by blending or otherwise combining the image of the displayable portion with an image of all of the virtual content. Since the image of all of the virtual content will generally have more contrast, blending may have the effect of adding contrast to the image of the displayable portion. This added contrast can be used to achieve visual effects that mimic shadows and other natural visual characteristics. The blending may selectively use relatively more of certain contrast levels than other contrast levels of each image to selectively increase contrast with limited addition to overall brightness. In some implementations, a first contrast level portion of the image of all of the virtual content is blended according to a first blending factor and a second contrast level portion of the image of all of the virtual content is blended according to a second, different blending factor.

Figure 7:
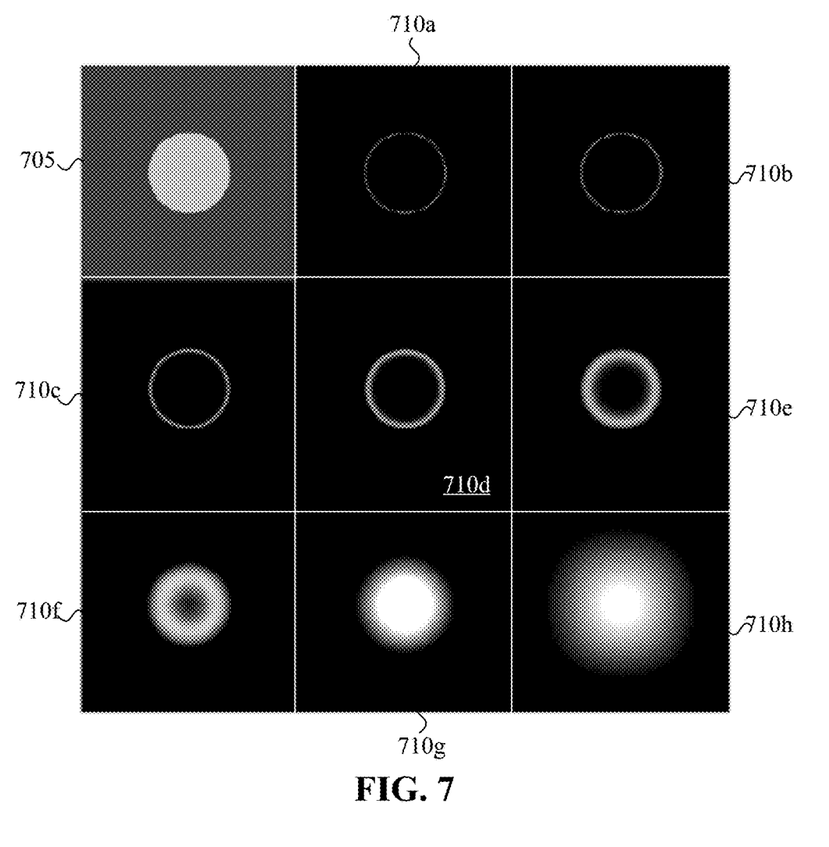
FIG. 7 illustrates illustrating various exemplary contrast levels.

FIG. 7 is illustrates various exemplary contrast levels. A given input image 705 is decomposed into layers corresponding to different contrast levels using a difference of Gaussians, e.g., layer one 710a, layer 2 710b, layer three 710c, layer 4 710d, layer five 710e, layer six 710f, layer seven 710g, layer eight 710h. The combination of these layers added together yields the input image. In blending an image of the displayable portion (image 1) with an image of all of the virtual content (image 2), each of these images can be decomposed into multiple layers. The images may then be blended or otherwise combined using a technique that weighs the layers of each image differently. In one implementation, for example, the images are blended according to the following table:

| Layer | Percentage of Image 1 Used in Blending | Percentage of Image 2 Used in Blending |
|---|---|---|
| 1 | 100% | 0% |
| 2 | 100% | 0% |
| 3 | 100% | 0% |
| 4 | 100% | 0% |
| 5 | 10% | 90% |
| 6 | 10% | 90% |
| 7 | 100% | 0% |
| 8 | 100% | 0% |

In some implementations, a pyramid blending technique is used. In some implementations, the images are represented using a pyramid representation that decomposes the images into different layers:

$$P(I) = (I - I_{\sigma_1}) + (I_{\sigma_1} - I_{\sigma_2}) + (I_{\sigma_2} - I_{\sigma_3}) + I_{\sigma_3}$$

$$= I_{\sigma_N} + \sum_{l=1}^{N} (I_{\sigma_{l-1}} - I_{\sigma_l})$$

The blending can use such a pyramid representation to perform a blending function:

$$M(A, B) = (1 - \lambda_N)A_{\sigma_N} + \sum_{l=1}^{N}(1 - \lambda_l)(A_{\sigma_{l-1}} - A_{\sigma_l}) + \lambda_N B_{\sigma_N} + \sum_{l=1}^{N}\lambda_l(B_{\sigma_{l-1}} - B_{\sigma_l})$$

where A and B are the images, l is layer, and λ is a variable that can be selected to strategically blend certain layers of each of the images.

Figure 8:
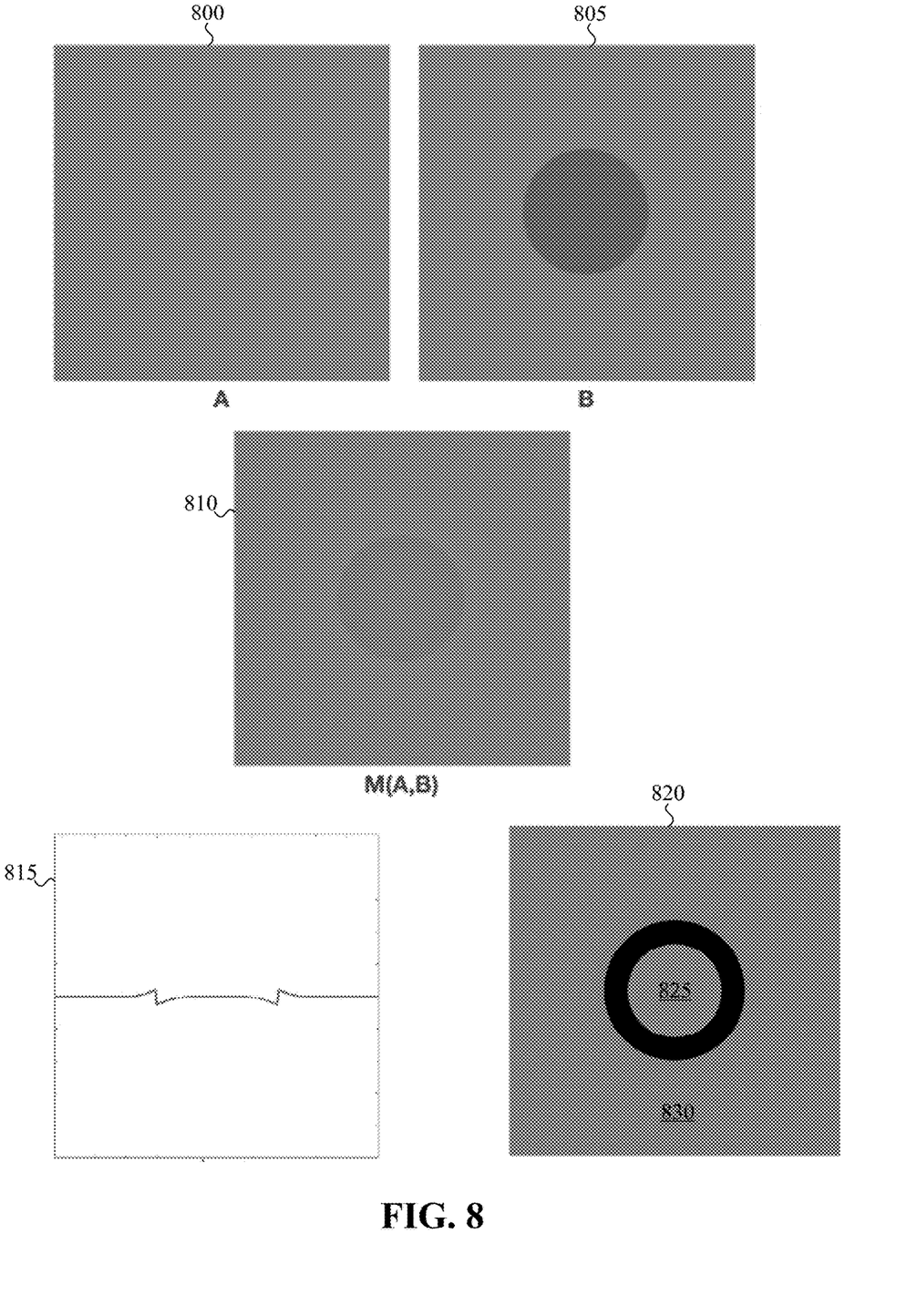
FIG. 8 illustrates enhanced local contrast providing desirable visual effects.

FIG. 8 illustrates enhanced local contrast providing desirable visual effects. In this example, a target appearance 805 includes a darker portion that cannot be achieved using added virtual content. Accordingly, the displayable portion of an image of virtual content would add no darkness. As depicted in image 800, without added darkness, the grey background is entirely visible and appears consistent in color throughout. In contrast by using enhanced virtual content, as depicted in image 810, an appearance of a darker portion can be provided. In this example, a blending of the displayable portion of the virtual content and all of the virtual content is used to produce virtual content this is displayable and that adds contrast that gives an appearance of a darker portion.

The scanline plot 815 illustrates how the enhanced contrast is provided by only adding brightness. In this example, the lowest points in the scanline plot 815 correspond to the brightness of the background grey. Brightness is added to other points selectively to add contrast around the edges of the darker portion and give the appearance that the center portion is darker than the rest. However, as illustrated in image 820, which covers up the transition region to which the contrast was added, the inner portion 825 is not actually darker than the outer portion 830.

In some circumstances, the blending or other combination of an image of a displayable portion of virtual content with an image of all of the virtual content yields a result in which there are some areas that still have negative brightness. In such circumstances, in some implementations, an adjustment is made to ensure that enhanced virtual content is capable of being displayed on the see-through device. In some implementations this involves identifying a negative bounds and adding it to the virtual content to ensure that all of the virtual content has positive brightness. In some implementations, the enhanced virtual content is adjusted by brightening only the negative portions to avoid the negative brightness, adjusted to shift some or all portions to be brighter so that no portion has negative brightness, or otherwise adjusted to ensure that the enhanced virtual content does not include content that cannot be displayed. In some implementations, all values of the enhanced content (e.g., over the entire image) are increased by the same brightness amount, e.g., so that the most negative pixel is no longer negative.

Returning to FIG. 5, after generating enhanced virtual content by enhancing local contrast of the image of the displayable portion of the virtual content, at block 508 the method 500 displays the enhanced virtual content on the see-through device.

Figure 9:
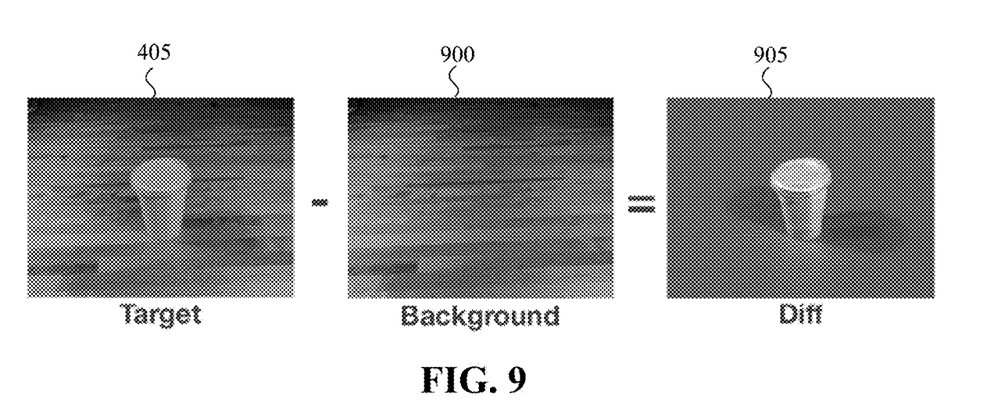
FIG. 9 illustrates the creation of virtual content (corresponding to positive and negative brightness) from a target appearance and background.
Figure 10:
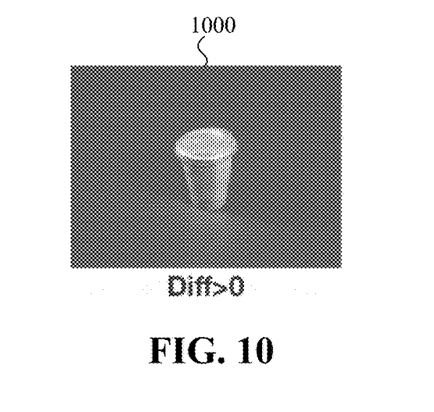
FIG. 10 illustrates a displayable portion of the virtual content of FIG. 9.
Figure 11:
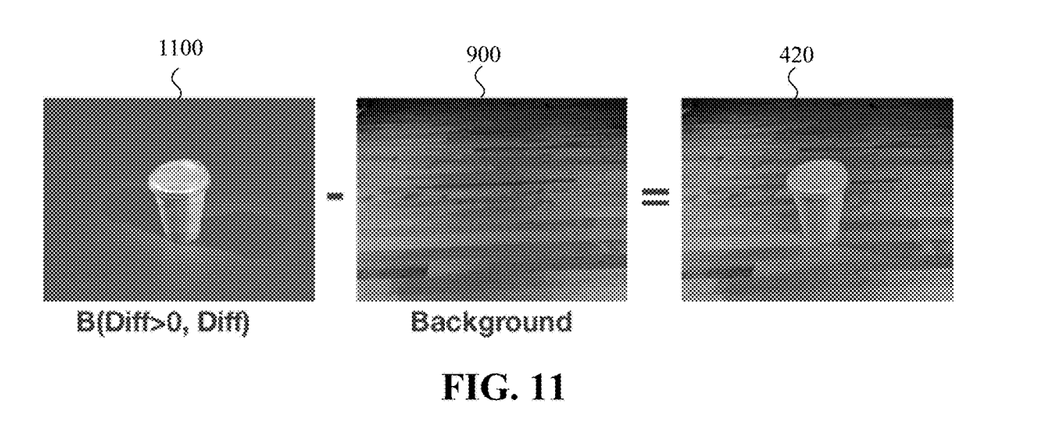
FIG. 11 illustrates the use of enhanced virtual content and a background to provide content.

FIGS. 9-11 illustrate the creation and display of enhanced virtual content having enhanced local contrast. FIG. 9 is a block diagram illustrating the creation of virtual content (corresponding to positive and negative brightness) from a target appearance and background. In this example, a background 900 is subtracted from a target appearance image 405 to produce an image of all virtual content 905 (e.g., Diff). FIG. 10 is a block diagram illustrating an image of a displayable portion of the virtual content 1000 (e.g., Diff>0). The image of a displayable portion of the virtual content 1000 (e.g., Diff>0) and the image of all virtual content 905 (e.g., Diff) are blended to produce enhanced virtual content 1100. In FIG. 11, the enhanced virtual content 1100 is combined with the background 900 to provide the environment with enhancements 420. The environment with enhancements 420 provides a visual appearance similar to the target appearance image 405 without needing to add negative brightness to give the appearance of shadows.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor and a see-through display:
   generating virtual content, wherein the virtual content comprises a first portion having a brightness value above a threshold brightness value such that the first portion is displayable via a see-through head-mounted device (HMD) and a second portion having a brightness value below the threshold brightness value;
   determining an image of a displayable portion of the virtual content by selecting the first portion of the virtual content based on the brightness value of the first portion being greater than the threshold brightness value and excluding the second portion of the virtual content based on the brightness value of the second portion being below the threshold brightness value;
   generating enhanced virtual content by enhancing local contrast of the image of the displayable portion of the virtual content; and
   displaying the enhanced virtual content on the see-through display.

2. The method of claim 1, wherein generating the virtual content comprises determining a target appearance of the virtual content based on a physical environment.

3. The method of claim 2, wherein determining the target appearance of the virtual content comprises determining a virtual shadow of a virtual object based on a light source in the physical environment.

4. The method of claim 2, wherein determining the target appearance of the virtual content comprises determining a three-dimensional rendering of the virtual content using a photo-realistic 3D rendering technique and an image or model of the physical environment.

5. The method of claim 2, further comprising determining an image of all of the virtual content by subtracting an image of the physical environment from the target appearance.

6. The method of claim 1, wherein determining the image of the displayable portion of the virtual content comprises excluding portions of the virtual content corresponding to negative brightness.

7. The method of claim 1, wherein generating the enhanced virtual content comprises blending the image of the displayable portion with an image of all of the virtual content.

8. The method of claim 7, wherein the blending is based on contrast level.

9. The method of claim 8, wherein:
a first contrast level portion of the image of all of the virtual content is blended according to a first blending factor; and
a second contrast level portion of the image of all of the virtual content is blended according to a second blending factor,
wherein the first blending factor is different than the second blending factor.

10. The method of claim 7, wherein the blending comprises an adjustment to ensure that enhanced virtual content is capable of being displayed on the see-through device.

11. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
generating virtual content, wherein the virtual content comprises a first portion having a brightness value above a threshold brightness value such that the first portion is displayable via a see-through head-mounted device (HMD) and a second portion having a brightness value below the threshold brightness value;
determining an image of a displayable portion of the virtual content by selecting the first portion of the virtual content based on the brightness value of the first portion being greater than the threshold brightness value and excluding the second portion of the virtual content based on the brightness value of the second portion being below the threshold brightness value;
generating enhanced virtual content by enhancing local contrast of the image of the displayable portion of the virtual content; and
displaying the enhanced virtual content on the see-through display.

12. The system of claim 11, wherein generating the virtual content comprises determining a virtual shadow of a virtual object based on a light source in a physical environment.

13. The system of claim 11, wherein the operations further comprise determining an image of all of the virtual content by subtracting an image of a physical environment from the target appearance.

14. The system of claim 11, wherein determining the image of the displayable portion of the virtual content comprises excluding portions of the virtual content corresponding to negative brightness.

15. The system of claim 11, wherein generating the enhanced virtual content comprises blending the image of the displayable portion with an image of all of the virtual content.

16. The system of claim 15, wherein the blending is based on contrast level.

17. The system of claim 16, wherein:
a first contrast level portion of the image of all of the virtual content is blended according to a first blending factor; and
a second contrast level portion of the image of all of the virtual content is blended according to a second blending factor,
wherein the first blending factor is different than the second blending factor.

18. A non-transitory computer-readable storage medium, storing program instructions computer-executable on a computer to perform operations comprising:
generating virtual content, wherein the virtual content comprises a first portion having a brightness value above a threshold brightness value such that the first portion is displayable via a see-through head-mounted device (HMD) and a second portion having a brightness value below the threshold brightness value;
determining an image of a displayable portion of the virtual content by selecting the first portion of the virtual content based on the brightness value of the first portion being greater than the threshold brightness value and excluding the second portion of the virtual content based on the brightness value of the second portion being below the threshold brightness value;
generating enhanced virtual content by enhancing local contrast of the image of the displayable portion of the virtual content; and
displaying the enhanced virtual content on the see-through display.

19. The non-transitory computer-readable storage medium claim 18, wherein generating the enhanced virtual content comprises blending the image of the displayable portion with an image of all of the virtual content.

20. The non-transitory computer-readable storage medium of claim 19, wherein the blending is based on contrast level.

21. A method comprising:
at an electronic device having a processor:
generating virtual content for inclusion in a computer-generated reality (CGR) environment;
determining an image of a displayable portion of the virtual content capable of being displayed on a see-through head-mounted device (HMD), wherein the displayable portion is a portion of the virtual content having a brightness value greater than a threshold brightness value;
generating enhanced virtual content by enhancing local contrast of the image of the displayable portion of the virtual content, wherein generating the enhanced virtual content comprises blending the image of the displayable portion with an image of all of the virtual content, wherein the blending is based on contrast level, wherein:
a first contrast level portion of the image of all of the virtual content is blended according to a first blending factor; and
a second contrast level portion of the image of all of the virtual content is blended according to a second blending factor, wherein the first blending factor is different than the second blending factor; and
presenting the CGR environment by displaying the enhanced virtual content on the see-through HMD.

* * * * *